OR 3,957,355

United States Patent [19]

Reinsch et al. [11] 3,957,355
[45] May 18, 1976

[54] OBJECTIVE SYSTEM WITH ZOOM LENS FOR MOTION PICTURE CAMERAS

[75] Inventors: Herbert Reinsch, Kongen; Peter Korner, Reichenbach; Horst Obermann, Stuttgart, all of Germany

[73] Assignee: Robert Bosch G.m.b.H., Stuttgart, Germany

[22] Filed: Nov. 18, 1974

[21] Appl. No.: 524,930

[30] Foreign Application Priority Data

Nov. 23, 1973 Germany............................ 2358345

[52] U.S. Cl.................................. 350/187; 350/255
[51] Int. Cl.[2]...................... G02B 15/18; G02B 7/10
[58] Field of Search............................ 350/187, 255

[56] References Cited

UNITED STATES PATENTS

| | | | |
|---|---|---|---|
| 2,732,763 | 1/1956 | Back et al. | 350/187 X |
| 3,655,271 | 4/1972 | Suzuki | 350/187 |
| 3,665,834 | 5/1972 | Toewe | 350/187 X |

*Primary Examiner*—Paul A. Sacher
*Attorney, Agent, or Firm*—Michael J. Striker

[57] ABSTRACT

An objective system for motion picture cameras wherein the focal length of a zoom lens is variable by rotating a ring-shaped selector about the optical axis through the medium of a radially extending handle, and focussing prior to the making of exposures at close range is effected by rotating the handle about its own axis. Prior to rotation of the handle about its axis, the selector must be moved to an angular position corresponding to the shortest focal length of the lens and the handle is thereupon depressed radially inwardly against the opposition of a spring so that an eccentric pin at its inner end enters a socket in a slide which is reciprocable in the lens barrel and is coupled to a sleeve for the optical elements of the lens by means of a follower which also serves to couple the sleeve to the selector. The handle can be depressed in a single angular position and can be moved outwardly to become disengaged from the slide only after it reassumes the single angular position. The selector may be completely or nearly completely concealed in the interior of a tubular extension of the front wall of the camera body.

16 Claims, 2 Drawing Figures

17 18 20 13 21 15 19 16 22a 22 23 32 25 12 34 35 11 33 10 27 1 I 1 31 29 6 26 28 30 9 4 8 5 7 3 2a 2 2b 2c 2d 17
18
20
13
21
15
19
16
22a
22
23
32
25
12
34
35
11
33
10
27
1
II
31
29
6
26
28
30
9
4
8
5
7
3
2a
2
2b
2c
2d

OBJECTIVE SYSTEM WITH ZOOM LENS FOR MOTION PICTURE CAMERAS

CROSS-REFERENCE TO RELATED APPLICATION

Certain features of our objective system are disclosed in the commonly owned copending application Ser. No. 505,601 filed Sept. 12, 1974 by Reinsch and Körner.

BACKGROUND OF THE INVENTION

The present invention relates to objective systems for photographic apparatus, and more particularly to improvements in objective systems which comprise variable-focus or zoom lenses. Still more particularly, the invention relates to objective systems having variable-focus lenses and means for focussing during the making of exposures at close range or at a greater distance (including infinity) from the subject. As used in the specification and claims, the term "objective system" is intended to denote a variable-focus lens, a tubular barrel or mount for the lens, and means for moving selected optical elements of the lens with respect to the barrel in the direction of the optical axis.

It is already known to provide an objective system for use in motion picture cameras with a variable-focus lens and with a rotary ring-shaped selector which can be displaced by means of a radially extending handle. When the handle is moved in a direction to rotate about the optical axis, the selector changes the focal length of the lens. In order to enable the selector to allow for focussing at close range, the handle is moved in the direction of the optical axis whereby such movement of the handle does not influence the positions of the optical elements but merely serves to disengage the selector from a further ring-shaped member which is connected with the optical elements of the lens. When the axial movement of the selector with the handle 1 is completed, the selector is rotated again to thereby focus prior to the making of exposures at close range. Such rotation causes a predetermined axial adjustment of certain optical elements of the lens.

It is further known to provide an objective system which includes a variable-focus lens with a selector which is rotatably and axially movably mounted on the barrel for the optical elements. When the selector is rotated in one axial position, it changes the focal length of the lens. Rotation of the selector in another axial position results in focussing prior to the making of exposures at close range.

Each of the just described prior solutions employs a single selector which must be rotated for the purpose of changing the focal length as well as for the purpose of focussing at close range. As a rule, the selector must be provided with a relatively wide annular knurled portion so that it may be readily gripped and conveniently manipulated by the user prior to and/or during picture taking. This is not possible when the selector is relatively small (e.g., if the manufacturer wishes to reduce the overall dimensions of the photographic apparatus) and/or when the selector is partly or nearly fully concealed in a forwardly extending part (e.g., a sleeve) of the camera body. In such instances, the selector is invariably provided with a radially extending handle which replaces the aforementioned knurled portion and enables the user to move the selector axially and/or about the axis of the lens.

SUMMARY OF THE INVENTION

An object of the invention is to provide an objective system for photographic apparatus, especially for motion picture cameras, wherein the optical elements of the variable-focus lens can be moved by novel and improved means which facilitates convenient manipulation even if the diameter of the selector (which forms part of such moving means) is very small and/or if the selector is fully or nearly fully concealed in the body of the photographic apparatus.

Another object of the invention is to provide the objective system with a versatile handle which facilitates the shifting of selected optical elements of the variable-focus lens with and/or relative to the selector.

A further object of the invention is to provide the objective system with novel and improved means for moving selected optical elements of the variable-focus lens for the purpose of focussing prior to the making of exposures at close range.

An additional object of the invention is to provide novel and improved motion transmitting connections between the handle for a ring-shaped selector and the optical elements of the variable-focus lens in the objective system of a motion picture camera. The objective system of the present invention comprises a tubular barrel, a variable-focus picture taking lens having a variator system including a plurality of optical elements disposed in the barrel one behind the other and being movable axially of the barrel to thereby focus the image of a subject (preferably at close range) and to change the focal length of the lens, and novel and improved means for moving the optical elements. Such moving means includes a handle which extends outwardly (preferably radially outwardly) from the barrel and is movable in a first direction about the optical axis of the lens (i.e., about the barrel) and in a different second direction (preferably about an axis extending radially of the barrel), first motion transmitting means for moving the optical elements in response to movement of the handle in the first direction to thereby change the focal length of the lens, and second motion transmitting means for moving the optical elements in response to movement of the handle in the second direction to thereby focus the image of a subject.

The first motion transmitting means may comprise a ring-shaped selector which comprises a sleeve or an analogous carrier or holder for the handle, a sleeve which is mounted in the barrel and surrounds the optical elements of the lens, and means (e.g., a follower) for connecting the selector with the sleeve. The second motion transmitting means preferably comprises a slide which is reciprocable in parallelism with the optical axis in guide means provided therefor in the barrel, a coupling which can connect the slide to the handle in response to movement of the handle substantially radially of the barrel from a first to a second position, and means for connecting the slide to the aforementioned sleeve in the barrel. Such connecting means may constitute the aforementioned follower which couples the sleeve to the slide in a predetermined angular position of the selector.

The novel features which are considered as characteristic of the invention are set forth in particular in the appended claims. The improved objective system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
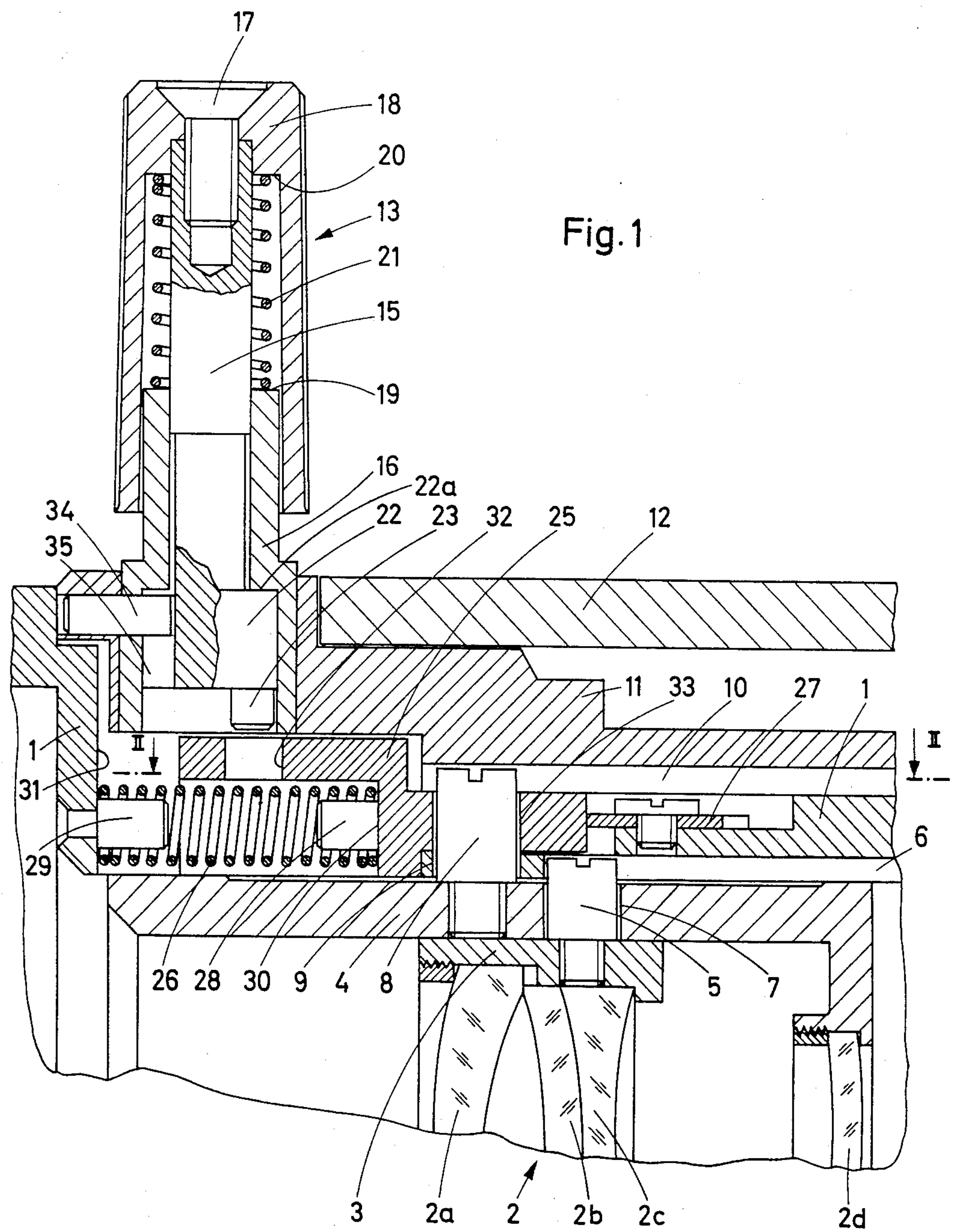
FIG. 1 is a fragmentary axial sectional view of an objective system with zoom lens and a handle which embodies the invention.

FIG. 1 shows an objective system which comprises a tubular barrel or mount 1 fixedly mounted in the body of a motion picture camera. The barrel 1 contains a variable-focus picture taking lens or zoom lens having two groups of optical elements including a front group (not shown) and a rear group or variator system 2 including four discrete optical elements 2*a*, 2*b*, 2*c* and 2*d*. The optical elements 2*a*–2*d* of the group 2 are disposed one behind the other, as considered in the direction of the optical axis, and are movable axially of the barrel 1 in order to adjust the focal length of the lens as well as for the purpose of focussing prior to the making of close-up shots. The front group of optical elements is shown at 3 in the copending application Ser. No. 505,601. Such front group can be moved axially by rotating the selector 16 of Ser. NO. 505,601 which selector is coupled to the ring 150 of Ser. No. 505,601. The threads of the ring 150 of Ser. No. 505,601 mesh directly with the barrel 1 of our objective system. Thus, the intermediate rings 18 and 19 of Ser. No. 505,601 can be omitted. Reference may also be had to U.S. Pat. No. 3,259,044 to MacMillin et al. which discloses a suitable adjusting device for the front group of optical elements in a variable-focus lens.

The optical elements 2*a*–2*c* are fixedly mounted in a ring 3 which is axially movably installed in a sleeve 4. The sleeve 4 is rotatable in the barrel 1 to thereby effect a movement of the ring 3 and optical elements 2*a*–2*c* in the direction of the optical axis of the picture taking lens. The ring 3 receives motion from a follower here shown as a screw 5 whose head extends through a cam slot 7 in the sleeve 4 and into a longitudinally extending guide groove 6 in the internal surface of the barrel 1. The rearmost optical element 2*d* of the variator system 2 is mounted directly in the rearmost portion of the sleeve 4. The sleeve 4 is further threadedly secured to a connecting means or follower 8 which extends radially outwardly in the region of the optical elements 2*b*, 2*c* so that its outermost portion projects into and is movable lengthwise of an internal groove 10 of a ring-shaped motion-transmitting selector 11. The selector 11 is rotatably mounted on the barrel 1 and its internal groove 10 is parallel to the optical axis of the lens. An intermediate portion of the follower 8 extends through an arcuate cam slot 9 of the barrel 1. The major portion of the selector 11 is confined in a tubular extension or sleeve 12 of the front wall (not shown) of the camera body. The means for rotating the selector 11 about the barrel 1 comprises a novel handle 13 which extends radially outwardly at the front end of the extension 12.

When the handle 13 is grasped by hand and is caused to rotate the selector 11 about the barrel 1, i.e., about the optical axis, the cam slots 7 and 9 cause the ring 3 and the optical elements 2*a*–2*d* of the variator system 2 to move in the direction of the optical axis in accordance with a predetermined pattern which is calculated to establish desirable optical characteristics of the lens. The optical element 2*d* rotates with the sleeve 4 but the optical elements 2*a*–2*c* merely move in the axial direction of the barrel 1 because the outer end portion of the follower 5 extends into the groove 6. The shortest focal length is selected when the followers 5 and 8 assume the illustrated positions, namely when the ring 3 (with the optical elements 2*a*–2*c*) is located at a maximum distance from the optical element 2*d*.

Figure 2:
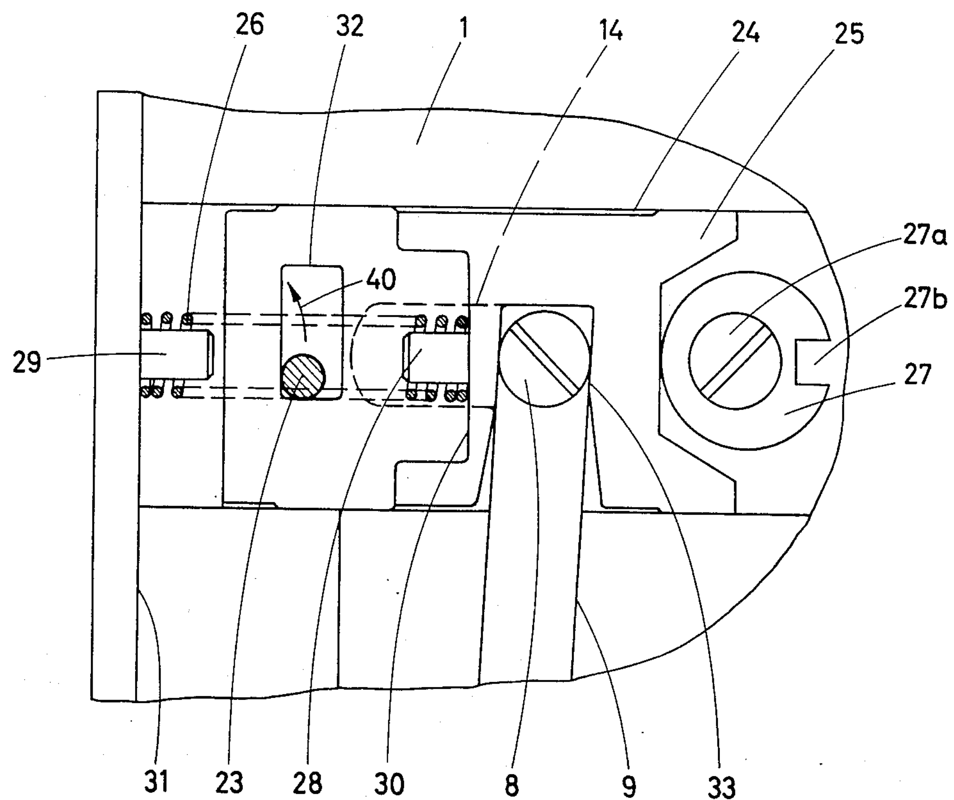
FIG. 2 is a fragmentary view substantially as seen in the direction of arrows from the line II—II of FIG. 1.

The barrel 1 is formed with an internal groove 14 (FIG. 2) which extends in parallelism with the optical axis and communicates with the cam slot 9. The groove 14 permits axial movements of the variator system 2 for the purpose of focussing prior to the making of close-up shots when the focal length of the lens has been reduced to a minimum value. The follower 8 is then in register with the slot 14 (as shown in FIG. 2) so that the sleeve 4 can be moved forwardly. During such movement of the sleeve 4 (i.e., when the follower 8 moves in the groove 14 of the barrel 1), the distance between the optical elements 2*a*–2*c* and 2*d* remains unchanged. The just described movement of the sleeve 4 is effected by rotating the handle 13 about its own axis. In addition, the handle 13 is movable axially, i.e., radially of the extension 12, selector 11 and barrel 1, between a first or extended position and a second or depressed position.

The handle 13 comprises a shaft 15 which is rotatably and axially movably mounted in a sleeve-like guide or carrier 16 of the selector 11. The outer end portion of the shaft 15 has a tapped bore for the shank of a screw 17 serving as a means for fastening the shaft 15 to a cupped handgrip portion 18 which surrounds the carrier 16. The outer end face 19 of the carrier 16 constitutes a retainer for the inner end convolution of a helical spring 21 which bears against an annular internal shoulder 20 of the handgrip portion 18 and serves to urge the shaft 15 to the extended position, i.e., away from the extension 12. The extended positions of the shaft 15 and handgrip portion 18 are shown in FIG. 1.

The inner end portion 22 of the shaft 15 has a larger diameter and constitutes a cylindrical plunger which is rotatable and axially movable in a counterbore at the inner end of the carrier 16. The inner end face of the plunger 22 has an eccentric projection or pin 23 which constitutes a first coupling means and can be introduced into a complementary second coupling means here shown as a socket or aperture 32 provided in a motion transmitting slide 25. The projection or pin 23 can enter the socket 32 in response to deformation of the spring 21. The slide 25 can transmit motion from the handle 13 (and more particularly from the shaft 15 and handgrip portion 18) to the optical elements 2*a*–2*d* of the variator system 2.

As shown in FIG. 2, the slide 25 is reciprocable in a guide groove 24 which is machined into the internal surface of the barrel 1 and is parallel to the optical axis of the lens. This slide is located inwardly of the groove 14 and is biased rearwardly (i.e., in a direction to the right, as viewed in FIG. 1 or 2) by a helical spring 26 which reacts against the foremost portion of the barrel 1; this foremost portion of the barrel has a radially extending surface 31 against which the foremost convolution of the spring 26 abuts. Furthermore, the surface 31 is formed with a projection or post 29 which is surrounded by the foremost convolutions of the spring 26. The rearmost convolutions of the spring 26 surround a similar projection or post 28 extending forwardly from a crosshead 30 of the slide 25. The spring 26 urges the slide 25 to a predetermined starting position in which the rear end of the slide abuts against an adjusting device here shown as a disk 27 which is eccentrically mounted on the shank of a screw 27*a* secured to the barrel 1. The angular position of the adjusting disk 27 (and hence the starting position of the slide 25 in the groove 24) can be changed by inserting a suitable tool into a peripheral notch 27*b* of the disk 27 and by thereupon turning the disk about the axis of the screw 27*a*. The slide 25 normally abuts against the disk 27 under the action of the spring 26; however, it can be moved forwardly and away from the disk 27 when the pin 23 of the plunger 22 extends into the socket 32 and the handgrip portion 18 is rotated about its axis to thereby displace the pin 23 through the medium of the shaft 15.

The socket 32 has a substantially rectangular shape and extends circumferentially of the barrel 1. The slide 25 is further formed with an open-ended slot 33 which can receive the follower 8. The width of the slot 33 approximates the width of the cam slot 9 in the barrel 1 and slightly exceeds the diameter of the follower 8. When the slide 25 assumes the starting position shown in FIG. 2, the slot 33 is in exact register with the slot 9, i.e., the follower 8 can enter the slot 33 as soon as the variator system 2 assumes the position of FIG. 1 which corresponds to the shortest focal length of the lens. The follower 8 thereupon moves forwardly in response to forward movement of the slide 25, i.e., in response to depression and subsequent rotation of the hand-grip portion 18 about the axis of the shaft 15.

The selector 11 has a blocking pin 34 which is parallel to the axis of the barrel 1 and extends through the carrier 16 and into a peripheral groove 35 of the plunger 22. The groove 35 is parallel to the axis of the shaft 15.

When the handgrip portion 18 is in the extended position of FIG. 1, the blocking pin 34 extends into the radially outermost portion of the groove 35 and holds the plunger 22, shaft 15 and handgrip portion 18 against rotation about the axis of the shaft 15. However, if the operator depresses the handgrip portion 18 to stress the spring 21, the outer end of the groove 35 moves inwardly beyond the blocking pin 34 so that the handgrip portion 18 is free to rotate about the axis of the shaft 15. At the same time, the pin 23 enters the socket 32 of the slide 25 so that rotation of the handgrip portion 18 entails a lengthwise movement of the slide 25 in the guide groove 24. If the handgrip portion 18 is turned only slightly from the angular position shown in FIG. 1 (while the pin 23 extends into the socket 32, the blocking pin 34 engages the outer end face or shoulder 22*a* of the plunger 22 and automatically holds the handgrip portion 18 in the depressed position against the opposition of the spring 21. Thus, the handgrip portion 18 is free to return to the extended position of FIG. 1 only when the shaft 15 and its plunger 22 assume the predetermined angular position of FIG. 1 in which the groove 34 can receive the blocking pin 34.

The operation is as follows:

If the user of the motion picture camera wishes to change the focal length of the lens, the selector 11 is rotated, preferably by way of the handle 13. Such angular movement of the selector 11 and of its internal groove 10 causes the follower 8 to move about the optical axis and to move the sleeve 4. An intermediate portion of the follower 8 travels in the cam slot 9 of the barrel 1 whereby the follower 8 causes the sleeve 4 to move axially. Also, as the sleeve 4 rotates in response to rotation of the selector 11, the cam slot 7 moves relative to the follower 5 whereby the latter moves the ring 3 and the optical elements 2*a*–2*c* in the direction of the optical axis. The configuration of the cam slot 7 is such that the optical elements 2*a*–2*c* move away from the optical element 2*d* while the user reduces the focal length of the lens.

In order to focus for the making of close-up shots, the user must reduce the focal length of the lens to the minimum value in a first step, i.e., the follower 8 must enter the slot 33 of the slide 25 and must be in register with the internal groove 14 of the barrel 1. The user thereupon depresses the handgrip portion 18 against the opposition of the spring 21 so that the groove 35 moves inwardly beyond the blocking pin 34 of the selector 11 and the pin 23 penetrates into the socket 32 of the slide 25. The user then rotates the handgrip portion 18 about the axis of the shaft 15 whereby the pin 23 causes the slide 25 to move in the guide groove 24 toward the post 29 on the foremost portion of the barrel 1. The direction in which the handgrip portion 18 can rotate the shaft 15 and its plunger 22 in order to move the slide 25 forwardly is indicated by the arrow 40 (FIG. 2). The slide 25 entrains the follower 8 which in turn entrains the sleeve 4, the follower 5 and ring 3, i.e., the optical elements 2*a*–2*d* are moved forwardly as a unit because the angular position of the sleeve 4 remains unchanged. Thus, the distance between the optical elements 2*a*–2*c* and optical element 2*d* remains unchanged while the slide 25 moves away from the adjusting disk 27. The just described lengthwise movement of the slide 25 results in focussing for the making of close-up shots. The user can release the handgrip portion 18 in the selected angular position (proper focussing for the making of close-up shots) because the friction between moving parts suffices to prevent accidental changes in angular position of the shaft 15 and its plunger 22. The handgrip portion 18 remains in the depressed position because the blocking pin 34 engages the outer end face or shoulder 22*a* of the plunger 22 and the plunger thereby bears against the pin 34 under the action of the spring 21. Such engagement between the plunger 22 and blocking pin 34 suffices to prevent unintentional angular displacements of the handle 18 under the action of the spring 26 which tends to move the slide 25 back into abutment with the disk 27.

If the camera is thereupon to make one or more normal exposures, the user rotates the handgrip portion 18 back to the angular position of FIG. 1 whereby the spring 21 expands and moves the plunger 22 radially outwardly so that the groove 35 receives the blocking pin 34. The pin 23 is withdrawn from the socket 32 whereby the spring 29 automatically returns the slide 25 into abutment with the adjusting disk 27. The focal length of the lens can be increased by rotating the selector 11 about the barrel 1.

The groove 35 is preferably located substantially diametrically opposite the pin 23. Thus, the pin 23 must be located in the rearmost position (as considered in the direction of the optical axis) in order to enter the socket 32 while the slide 25 abuts against the disk 27.

An advantage of the blocking means including the pin 34 and the plunger 22 with its groove 35 and shoulder 22*a*, and of the spring 21 is that such parts reduce the likelihood of improper manipulation of the means for moving the optical elements 2*a*–2*d*. Thus, the pin 34 prevents rotation (movement in the second direction) of the handgrip portion 18 about the axis of the shaft 15 when the handle 13 dwells in the extended position of FIG. 1 or in any other position except in the fully depressed position. Also, the pin 34 automatically blocks the movement of the handle 13 from the depressed position except when the handle assumes that angular position (with respect to the axis of the shaft 15) in which the pin 34 is in register with the groove 35 of the plunger 22. Thus, the optical elements 2*a*–2*d* automatically assume those positions which correspond to the shortest focal length of the lens when the slide 25 can be engaged by or disengaged from the pin 23 of the handle 13.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In an objective system for photographic apparatus, a combination comprising a tubular barrel; a variable-focus picture taking lens having a variator system including a plurality of optical elements disposed in said barrel one behind the other and being movable axially of said barrel to thereby change the focal length of said lens and to focus the image of a subject; and means for moving said optical elements, including a handle extending outwardly from said barrel and being movable in a first direction substantially circumferentially of said barrel and in a different second direction, first motion transmitting means for moving said optical elements in response to movement of said handle in said first direction to thereby change the focal length of said lens, and second motion transmitting means for moving said optical elements in response to movement of said handle in said second direction to thereby focus the image of a subject, said handle being further movable substantially radially of said barrel between first and second positions, said handle and said second motion transmitting means comprising complementary first and second coupling means which are engaged with each other only in one of said positions of said handle to move said second motion transmitting means in response to movement of said handle in said second direction while said handle assumes said one position.

2. A combination as defined in claim 1, wherein said handle has an axis which extends substantially radially of said barrel and said movement in said second direction constitutes a rotary movement about said axis.

3. A combination as defined in claim 1, further comprising means for biasing said handle to the other of said positions.

4. A combination as defined in claim 1, wherein said second motion transmitting means further comprises a slide which is reciprocable in parallelism with the axis of said barrel and said second coupling means comprises a socket in said slide, said first coupling means comprising a projection which enters said socket in response to movement of said handle to said one position.

5. A combination as defined in claim 4, wherein said barrel has guide means for said slide and further comprising means for biasing said slide to a predetermined position from which said slide is shifted in response to movement of said handle in said second direction in said one position of said handle.

6. A combination as defined in claim 4, wherein said handle has an axis extending substantially radially of said barrel and said movement in said second direction constitutes an angular movement about said last mentioned axis, said projection being laterally offset with respect to said last mentioned axis.

7. A combination as defined in claim 6, wherein said first motion transmitting means comprises a hollow carrier and said handle further comprises a shaft which is reciprocable in said carrier between said first and second positions and is rotatable in said carrier about said last mentioned axis, and a handgrip portion rigid with said shaft and surrounding said carrier.

8. A combination as defined in claim 7, further comprising means for biasing said handle to the other of said positions, including a spring reacting against said carrier and bearing against said handgrip portion.

9. A combination as defined in claim 1, further comprising means for blocking the movement of said handle in said second direction in response to movement of said handle from said one position.

10. A combination as defined in claim 1, wherein said second movement is an angular movement about an axis extending sbstantially radially of said barrel and further comprising means for blocking the movement of said handle from said one position thereof except in a single angular position of said handle.

11. A combination as defined in claim 10, wherein said blocking means comprises a device which also blocks the angular movement of said handle in response to movement of said handle from said one position.

12. A combination as defined in claim 11, further comprising means for biasing said handle to said other position, said blocking means comprising a groove provided in said handle and extending in parallelism with said axis, an annular shoulder provided on said handle at one end of said groove, and a pin provided on said first motion transmitting means and extending into said groove except in said one position of said handle, said pin engaging said shoulder in said one position of said handle and when said handle is rotated from said predetermined angular position, said biasing means storing energy in response to movement of said handle from said other to said one position to thereupon bias said shoulder against said pin in said one position of said handle and to return said handle to said other position when said handle assumes said single predetermined angular position so that said pin can reeneter said groove.

13. A combination as defined in claim 12, wherein said handle further comprises a plunger and said groove is provided in the periphery of said plunger, said plunger having an end face which constitutes said shoulder.

14. A combination as defined in claim 1, wherein said first motion transmitting means comprises a ring-shaped selector surrounding said barrel and being rotatable by said handle about the axis of said barrel.

15. A combination as defined in claim 14, wherein said lens further comprises a sleeve for said optical elements and said first motion transmitting means further comprises means for connecting said sleeve to said selector.

16. A combination as defined in claim 15, wherein said means for connecting said sleeve to said selector is connected to said second motion transmitting means in a predetermined angular position of said selector.

* * * * *